US012062313B2

(12) United States Patent
Ryu et al.

(10) Patent No.: US 12,062,313 B2
(45) Date of Patent: Aug. 13, 2024

(54) SYSTEMS AND METHODS FOR CLOCK FREQUENCY CONTROL DURING LOW DISPLAY REFRESH RATES IN ELECTRONIC DEVICES

(71) Applicant: Apple Inc., Cupertino, CA (US)

(72) Inventors: Jie Won Ryu, Santa Clara, CA (US); Kingsuk Brahma, Mountain View, CA (US); Qing Li, Cupertino, CA (US); Shawn P Hurley, Sunnyvale, CA (US); Ce Zhang, Cupertino, CA (US); Warren S Rieutort-Louis, Cupertino, CA (US); Feng Wen, Santa Clara, CA (US); Marc J DeVincentis, Palo Alto, CA (US); Zhe Hua, San Jose, CA (US); Hyunwoo Nho, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/296,937

(22) Filed: Apr. 6, 2023

(65) Prior Publication Data

US 2024/0013693 A1 Jan. 11, 2024

Related U.S. Application Data

(60) Provisional application No. 63/359,572, filed on Jul. 8, 2022.

(51) Int. Cl.
*G09G 3/20* (2006.01)

(52) U.S. Cl.
CPC ........... *G09G 3/20* (2013.01); *G09G 2310/08* (2013.01); *G09G 2330/021* (2013.01); *G09G 2340/0435* (2013.01)

(58) Field of Classification Search
CPC ................. G09G 3/20; G09G 2310/08; G09G 2330/021; G09G 2340/0435
See application file for complete search history.

(56) References Cited

U.S. PATENT DOCUMENTS

| | | | | |
|---|---|---|---|---|
| 10,366,663 | B2 | 7/2019 | Shepelev | |
| 2012/0169698 | A1 | 7/2012 | Park et al. | |
| 2018/0217424 | A1* | 8/2018 | Murakoso | G02F 1/1339 |
| 2018/0218481 | A1* | 8/2018 | Evans | H04N 5/20 |
| 2018/0218663 | A1* | 8/2018 | Guo | G09G 3/2092 |
| 2018/0218664 | A1* | 8/2018 | Liao | G09G 3/20 |
| 2018/0218686 | A1* | 8/2018 | Li | G09G 3/3677 |
| 2018/0218701 | A1* | 8/2018 | Yi | G11C 19/28 |
| 2021/0090483 | A1* | 3/2021 | Ji | G09G 3/20 |
| 2021/0090486 | A1* | 3/2021 | Zhang | G09G 3/32 |
| 2021/0090527 | A1* | 3/2021 | Lee | G09G 3/20 |
| 2021/0090528 | A1* | 3/2021 | Zheng | G09G 5/397 |
| 2021/0091923 | A1* | 3/2021 | Pyun | H03L 7/0891 |
| 2022/0114944 | A1 | 4/2022 | Duan et al. | |
| 2023/0318602 | A1* | 10/2023 | Jiang | H03K 19/00315 345/204 |

* cited by examiner

*Primary Examiner* — Sejoon Ahn
(74) *Attorney, Agent, or Firm* — Fletcher Yoder, P.C.

(57) ABSTRACT

This disclosure is directed towards systems and methods of power saving in electronic displays based on changing clock signal frequencies supplied to the gate-in-panel (GIP) circuitry during extended blanking modes of the electronic display. The display driver circuitry of the display may reduce and/or halt clock signal frequencies sent to GIP circuitry in the display, to reduce power output during extended blanking modes of the electronic display.

20 Claims, 8 Drawing Sheets

SYSTEMS AND METHODS FOR CLOCK FREQUENCY CONTROL DURING LOW DISPLAY REFRESH RATES IN ELECTRONIC DEVICES

CROSS-REFERENCE TO RELATED APPLICATIONS

This application claims priority to U.S. Provisional Application No. 63/359,572, filed on Jul. 8, 2022, entitled "SYSTEMS AND METHODS FOR CLOCK FREQUENCY CONTROL DURING LOW DISPLAY REFRESH RATES IN ELECTRONIC DEVICES," the contents of which is incorporated by reference in its entirety.

SUMMARY

This disclosure relates to systems and methods for clock frequency control during low display refresh rates in electronic devices. More specifically, systems and methods that enable clock signals sent to display control circuitry of the electronic device to be reduced in frequency and/or halted for a period of time during periods of lower display refresh rates in electronic devices.

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Electronic displays may display images that present visual representations of information. Accordingly, numerous electronic systems—such as computers, mobile phones, portable media devices, tablets, televisions, virtual-reality headsets, and vehicle dashboards, among many others often include or use electronic display. An electronic display may include many thousands to millions of display pixels. In any case, an electronic display may generally display an image by actively controlling light emission (e.g., luminance) from its display pixels.

An electronic display may take a variety of forms. For example, an electronic display may be an organic light-emitting diode (OLED) display. An OLED display may include display driver circuitry and an active area having a matrix of OLED display pixels connected to cathodes and anodes. The display driver circuitry may receive image data and program the electronic display to display image content based on the image data. The display driver circuitry programs the display pixels with data signals indicative of the image content. The display driver circuitry may subsequently provide an emission signal to the display pixels, causing the display pixels to emit light.

It may be desirable to lower output power during electronic display operations in which the display content is not rapidly changing. During these operations, the display may implement a lower refresh rate (e.g., extended blanking of the display). By reducing the refresh rate of the electronic display, display circuitry of the electronic display may be operated at a lower rate to lower power output of the display. However, even when the electronic display is operating at significantly lower display refresh rates (e.g., 10 Hertz (Hz), 1 Hz), the power consumption by certain control circuitry (e.g., gate-in-panel (GIP) circuitry) of the electronic display may not be lowered. The amount of power drawn by the certain control circuitry may be substantial, even while functions performed by the control circuitry may not be useful during extended blanking operations of the electronic display.

Accordingly, the present disclosure provides techniques for lowering power consumption of certain control circuitry (e.g., gate-in-panel (GIP) circuitry) of the electronic display during lower display refresh rates. The electronic display may be any suitable electronic display (e.g., an OLED display, a micro-LED display, a liquid crystal display (LCD)). The electronic display, during extended blanking mode operations, may reduce frequency of clock signals sent to the control circuitry and/or toggling of clock signals may be halted for a period of time. Prior to blanking mode operations of the display, the clock signals received at the control circuitry (e.g., GIP circuitry) of the display panel may be sent at an initial rate (e.g., 120 Hz). At this point, an image frame may be programmed into the pixels of the electronic display, and the electronic display may initiate extended blanking for the remainder of the image frame display. During the extended blanking operations of the electronic display, the clock frequency received at the control circuitry may be reduced to a half-frequency, quarter-frequency, halted for a certain period of time, or any other suitable frequency reduction relative to clock signal frequency during normal mode operations of the electronic display. In some embodiments, certain portions of the GIP circuitry may have clock frequency signals halted during extended blanking operations, and some portions of the GIP circuitry may have received clock signal frequency reduced but not halted due to leakage effects associated with halting certain portions of GIP circuitry. It should be understood that any suitable clock signal frequency reduction and/or halting may be applied to each portion of the GIP circuitry. During normal mode display operations, the display may be reprogrammed to resume a baseline display frequency, and the clock signal frequency received at the GIP circuitry may return to full frequency clock signals.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings described below.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

Figure 1:
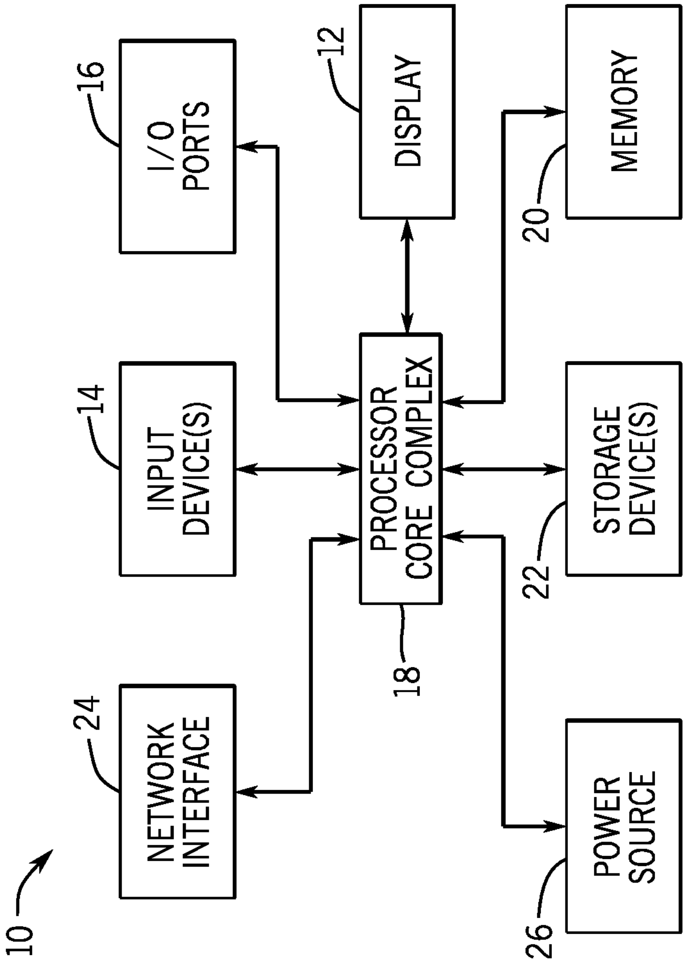
FIG. 1 is a block diagram of an electronic device with an electronic display, in accordance with an embodiment.

With the preceding in mind and to help illustrate, an electronic device 10 including an electronic display 12 is shown in FIG. 1. As is described in more detail below, the electronic device 10 may be any suitable electronic device, such as a computer, a mobile phone, a portable media device, a tablet, a television, a virtual-reality headset, a wearable device such as a watch, a vehicle dashboard, or the like. Thus, it should be noted that FIG. 1 is merely one example of a particular implementation and is intended to illustrate the types of components that may be present in an electronic device 10.

The electronic device 10 includes the electronic display 12, one or more input devices 14, one or more input/output (I/O) ports 16, a processor core complex 18 having one or more processing circuitry(s) or processing circuitry cores, local memory 20, a main memory storage device 22, a network interface 24, and a power source 26 (e.g., power supply). The various components described in FIG. 1 may include hardware elements (e.g., circuitry), software elements (e.g., a tangible, non-transitory computer-readable medium storing executable instructions), or a combination of both hardware and software elements. It should be noted that the various depicted components may be combined into fewer components or separated into additional components. For example, the local memory 20 and the main memory storage device 22 may be included in a single component.

The processor core complex 18 is operably coupled with local memory 20 and the main memory storage device 22. Thus, the processor core complex 18 may execute instructions stored in local memory 20 or the main memory storage device 22 to perform operations, such as generating or transmitting image data to display on the electronic display 12. As such, the processor core complex 18 may include one or more general purpose microprocessors, one or more application specific integrated circuits (ASICs), one or more field programmable logic arrays (FPGAs), or any combination thereof.

In addition to program instructions, the local memory 20 or the main memory storage device 22 may store data to be processed by the processor core complex 18. Thus, the local memory 20 and/or the main memory storage device 22 may include one or more tangible, non-transitory, computer-readable media. For example, the local memory 20 may include random access memory (RAM) and the main memory storage device 22 may include read-only memory (ROM), rewritable non-volatile memory such as flash memory, hard drives, optical discs, or the like.

The network interface 24 may communicate data with another electronic device or a network. For example, the network interface 24 (e.g., a radio frequency system) may enable the electronic device 10 to communicatively couple to a personal area network (PAN), such as a Bluetooth network, a local area network (LAN), such as an 802.11x Wi-Fi network, or a wide area network (WAN), such as a 4G, Long-Term Evolution (LTE), or 5G cellular network. The power source 26 may provide electrical power to one or more components in the electronic device 10, such as the processor core complex 18 or the electronic display 12. Thus, the power source 26 may include any suitable source of energy, such as a rechargeable lithium polymer (Li-poly) battery or an alternating current (AC) power converter. The I/O ports 16 may enable the electronic device 10 to interface with other electronic devices. For example, when a portable storage device is connected, the I/O port 16 may enable the processor core complex 18 to communicate data with the portable storage device.

The input devices 14 may enable user interaction with the electronic device 10, for example, by receiving user inputs via a button, a keyboard, a mouse, a trackpad, a touch sensing, or the like. The input device 14 may include touch-sensing components (e.g., touch control circuitry, touch sensing circuitry) in the electronic display 12. The touch sensing components may receive user inputs by detecting occurrence or position of an object touching the surface of the electronic display 12.

In addition to enabling user inputs, the electronic display 12 may be a display panel with one or more display pixels. For example, the electronic display 12 may include a self-emissive pixel array having an array of one or more of self-emissive pixels. The electronic display 12 may include any suitable circuitry (e.g., display driver circuitry) to drive the self-emissive pixels, including for example row driver and/or column drivers (e.g., display drivers). Each of the self-emissive pixels may include any suitable light emitting element, such as a LED or a micro-LED, one example of which is an OLED. However, any other suitable type of pixel, including non-self-emissive pixels (e.g., liquid crystal as used in liquid crystal displays (LCDs), digital micromirror devices (DMD) used in DMD displays) may also be used. The electronic display 12 may control light emission from the display pixels to present visual representations of information, such as a graphical user interface (GUI) of an operating system, an application interface, a still image, or video content, by displaying frames of image data. To display images, the electronic display 12 may include display pixels implemented on the display panel. The display pixels may represent sub-pixels that each control a luminance value of one color component (e.g., red, green, or blue for an RGB pixel arrangement or red, green, blue, or white for an RGBW arrangement).

The electronic display 12 may display an image by controlling pulse emission (e.g., light emission) from its display pixels based on pixel or image data associated with corresponding image pixels (e.g., points) in the image. In some embodiments, pixel or image data may be generated by an image source (e.g., image data, digital code), such as the processor core complex 18, a graphics processing unit (GPU), or an image sensor. Additionally, in some embodiments, image data may be received from another electronic device 10, for example, via the network interface 24 and/or an I/O port 16. Similarly, the electronic display 12 may display an image frame of content based on pixel or image data generated by the processor core complex 18, or the electronic display 12 may display frames based on pixel or image data received via the network interface 24, an input device, or an I/O port 16.

Figure 2:
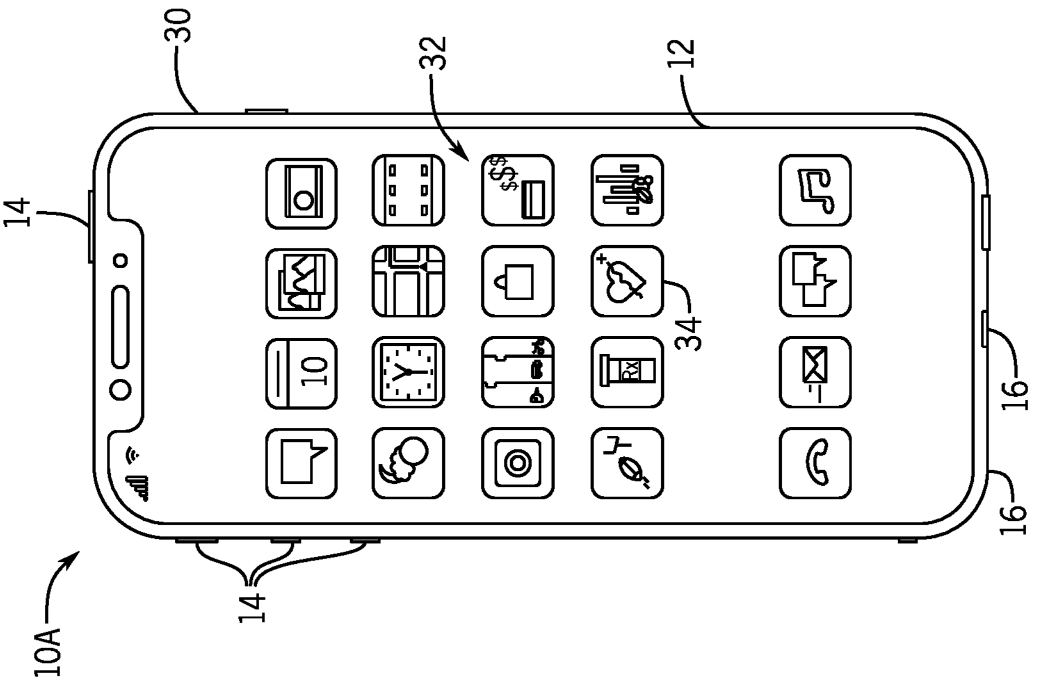
FIG. 2 is an example of the electronic device of FIG. 1, in accordance with an embodiment.

The electronic device 10 may be any suitable electronic device. To help illustrate, an example of the electronic device 10, a handheld device 10A, is shown in FIG. 2. The handheld device 10A may be a portable phone, a media player, a personal data organizer, a handheld game platform, or the like. For illustrative purposes, the handheld device 10A may be a smart phone, such as any IPHONE® model available from Apple Inc.

The handheld device 10A includes an enclosure 30 (e.g., housing). The enclosure 30 may protect interior components from physical damage or shield them from electromagnetic interference, such as by surrounding the electronic display 12. The electronic display 12 may display a graphical user interface (GUI) 32 having an array of icons. When an icon 34 is selected either by an input device 14 or a touch-sensing component of the electronic display 12, an application program may launch.

The input devices 14 may be accessed through openings in the enclosure 30. The input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, or toggle between vibrate and ring modes.

Figure 3:
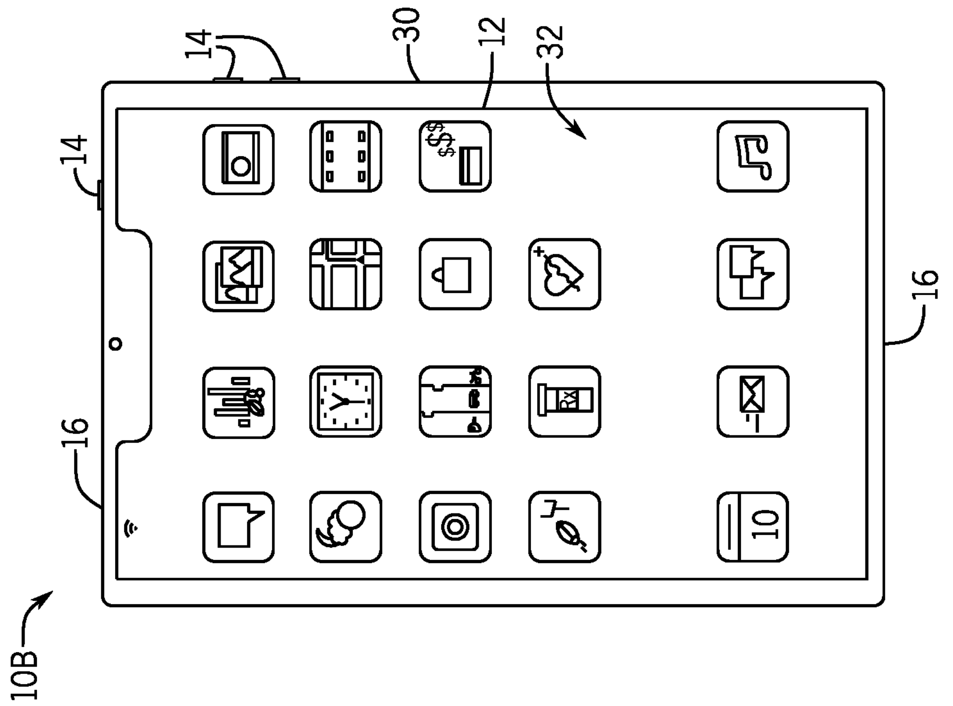
FIG. 3 is another example of the electronic device of FIG. 1, in accordance with an embodiment.
Figure 4:
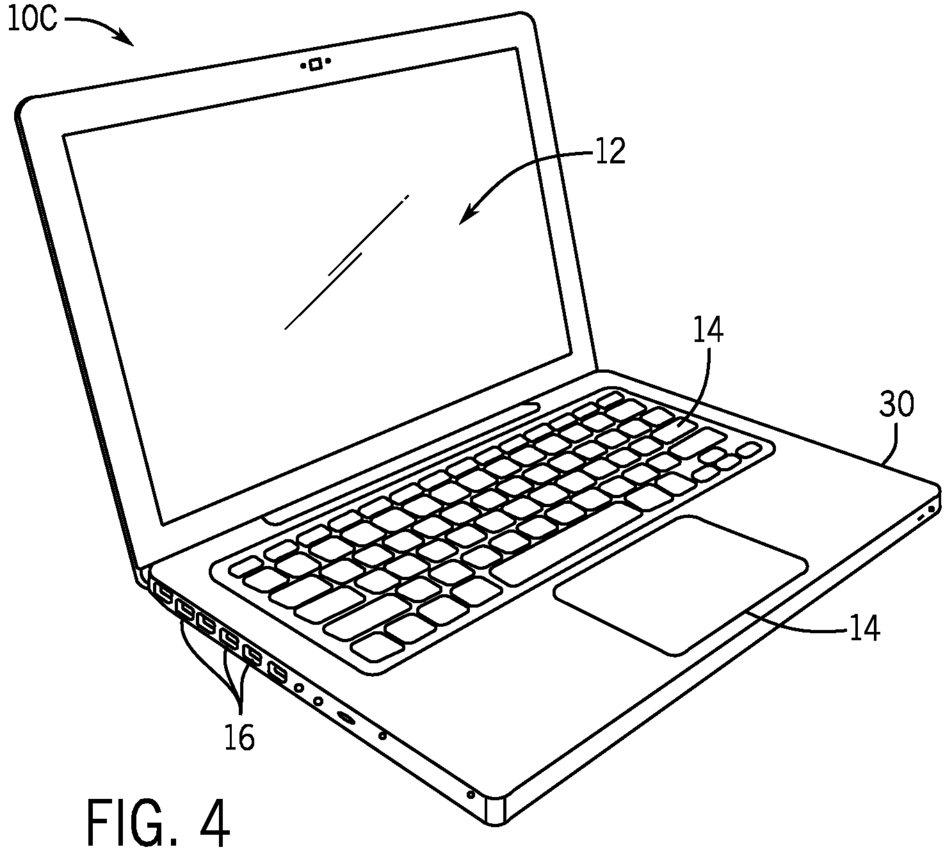
FIG. 4 is another example of the electronic device of FIG. 1, in accordance with an embodiment.
Figure 5:
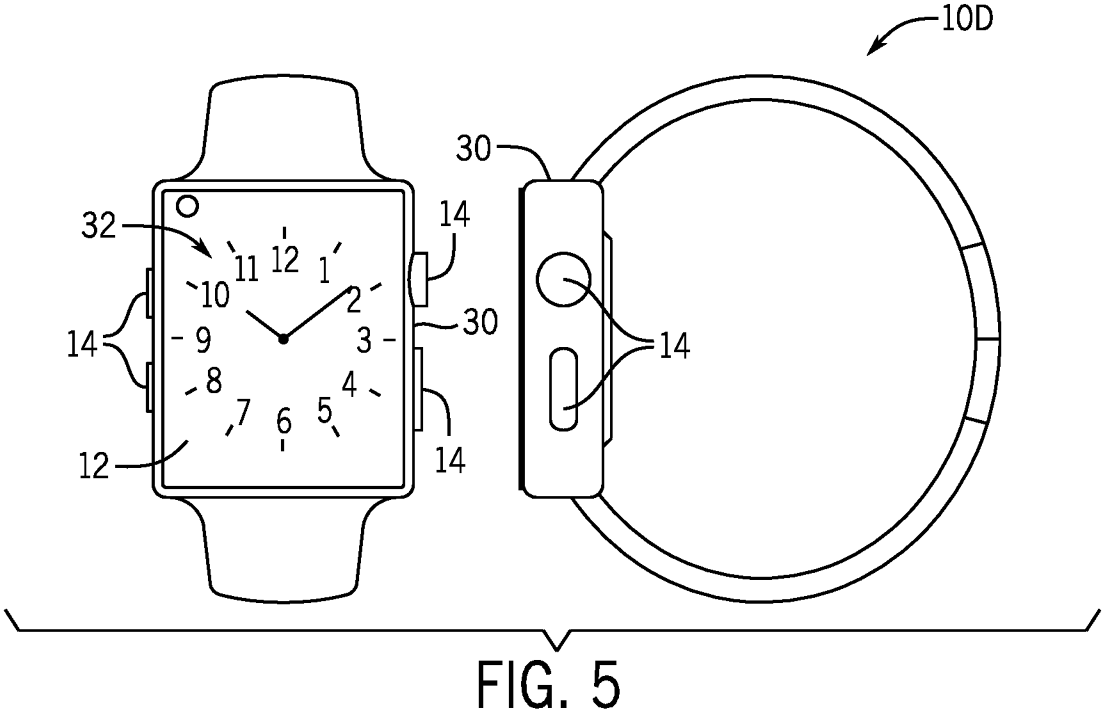
FIG. 5 is another example of the electronic device of FIG. 1, in accordance with an embodiment.

Another example of a suitable electronic device 10, specifically a tablet device 10B, is shown in FIG. 3. The tablet device 10B may be any IPAD® model available from Apple Inc. A further example of a suitable electronic device 10, specifically a computer 10C, is shown in FIG. 4. For illustrative purposes, the computer 10C may be any MACBOOK® or IMAC® model available from Apple Inc. Another example of a suitable electronic device 10, specifically a watch 10D, is shown in FIG. 5. For illustrative purposes, the watch 10D may be any APPLE WATCH® model available from Apple Inc. As depicted, the tablet device 10B, the computer 10C, and the watch 10D each also includes an electronic display 12, input devices 14, I/O ports 16, and an enclosure 30. The electronic display 12 may display a GUI 32. Here, the GUI 32 shows a visualization of a clock. When the visualization is selected either by the input device 14 or a touch-sensing component of the electronic display 12, an application program may launch, such as to transition the GUI 32 to presenting the icons 34 discussed in FIGS. 2 and 3.

Figure 6:
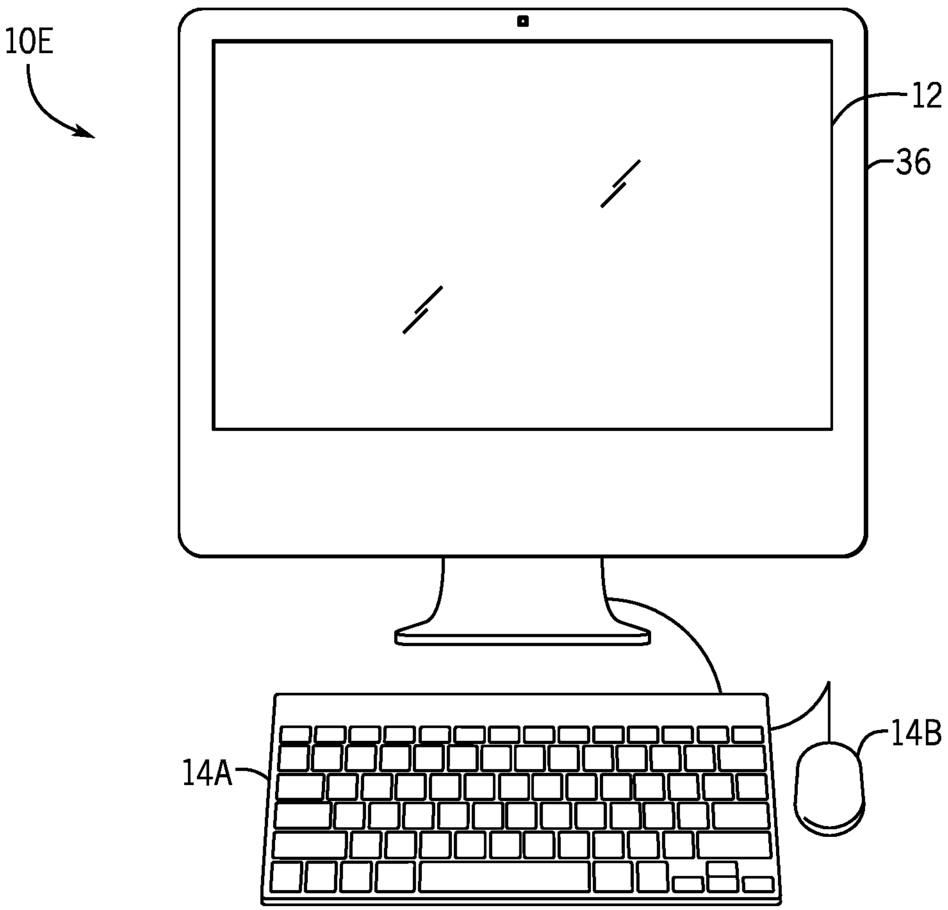
FIG. 6 is another example of the electronic device of FIG. 1, in accordance with an embodiment.

Turning to FIG. 6, a computer 10E may represent another embodiment of the electronic device 10 of FIG. 1. The computer 10E may be any computer, such as a desktop computer, a server, or a notebook computer, but may also be a standalone media player or video gaming machine. By way of example, the computer 10E may be an iMac®, a MacBook®, or other similar device by Apple Inc. of Cupertino, California. It should be noted that the computer 10E may also represent a personal computer (PC) by another manufacturer. A similar enclosure 36 may be provided to protect and enclose internal components of the computer 10E, such as the electronic display 12. In certain embodiments, a user of the computer 10E may interact with the computer 10E using various peripheral input structures 14, such as the keyboard 14A or mouse 14B (e.g., input structures 14), which may connect to the computer 10E.

Figure 7:
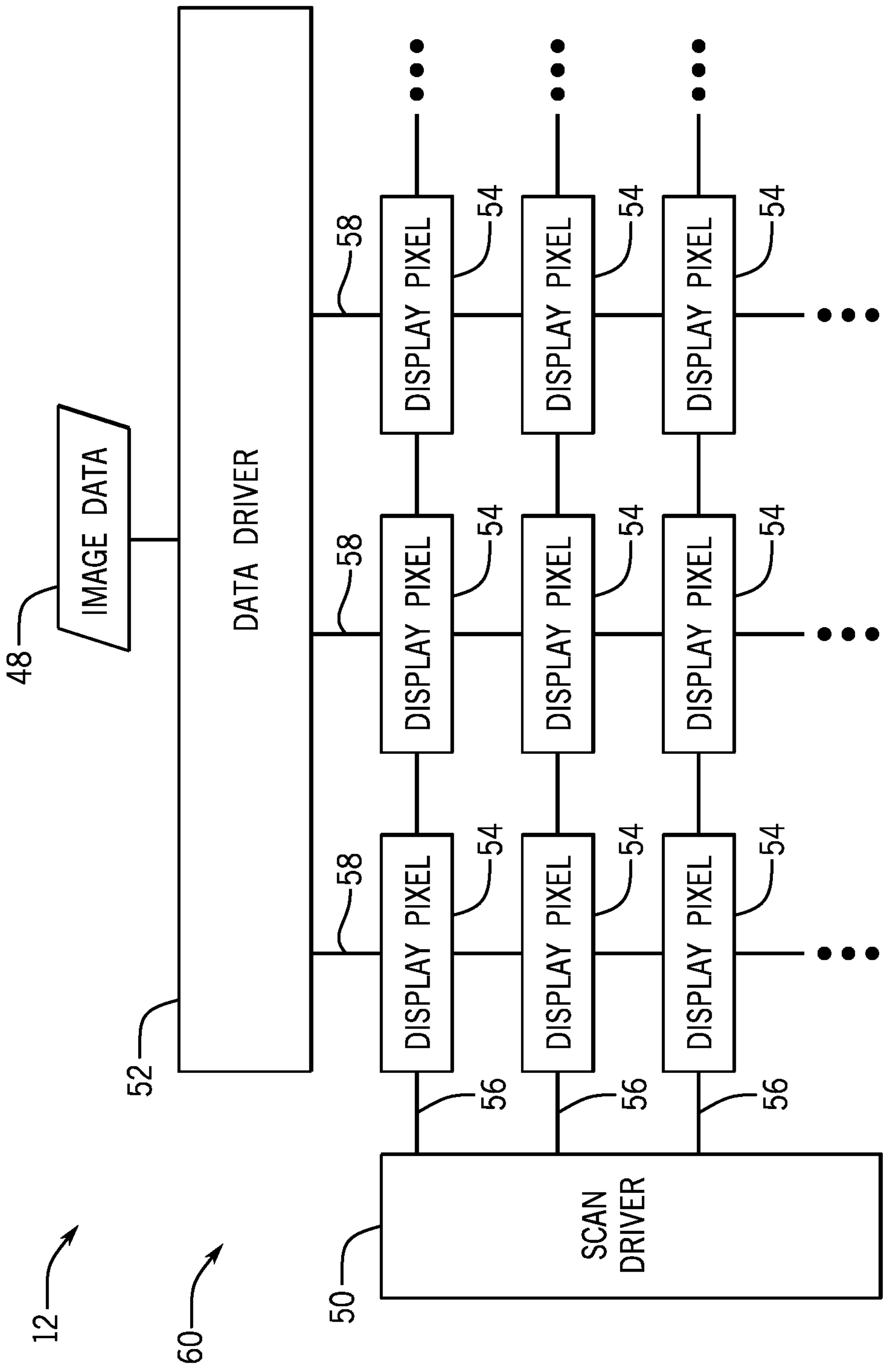
FIG. 7 is a block diagram of the electronic display, in accordance with an embodiment.

As shown in FIG. 7, the electronic display 12 may receive image data 48 for display on the electronic display 12. The electronic display 12 includes display driver circuitry 60 that includes scan driver circuitry 50 and data driver circuitry 52 that can program the image data 48 onto display pixels 54 of an active area 55. The display pixels 54 may each contain one or more self-emissive elements, such as a light-emitting diodes (LEDs) (e.g., organic light emitting diodes (OLEDs) or micro-LEDs (μLEDs)). Different display pixels 54 may emit different colors. For example, some of the display pixels 54 may emit red light, some may emit green light, and some may emit blue light. Thus, the display pixels 54 may be driven to emit light at different brightness levels to cause a user viewing the electronic display 12 to perceive an image formed from different colors of light. The display pixels 54 may also correspond to hue and/or luminance levels of a color to be emitted and/or to alternative color combinations, such as combinations that use cyan (C), magenta (M), and yellow (Y), or any other suitable color combinations.

The scan driver circuitry 50 may provide scan signals (e.g., pixel reset, data enable, on-bias stress) over any suitable number of scan lines 56 per row to control the display pixels 54 by row. For example, the scan driver circuitry 50 may cause a row of the display pixels 54 to become enabled to receive a portion of the image data 48 from data lines 58 from the data driver circuitry 52. In this way, an image frame of image data 48 may be programmed onto the display pixels 54 row by row. Other examples of the electronic display 12 may program the display pixels 54 in groups other than by row.

For the display pixels 54 to emit light, the self-emissive elements of the display pixels 54 may receive a voltage from a cathode and/or an anode. For example, the self-emissive element may be an OLED. When the voltage is applied across the OLED, the OLED may light up causing the associated display pixel 54 to emit light. To provide the voltage, the cathode and the anode may be coupled to power supply circuitry. The electronic device 10 may include a power management integrated circuitry (PMIC) (e.g., via the processor core complex 18 and/or the processing circuitry) that provides power supply circuitry to the electronic display 12. As discussed above, the display driver circuitry 60 may implement one or more clock control operations during extended blanking mode display operations of the electronic display 12.

Figure 8:
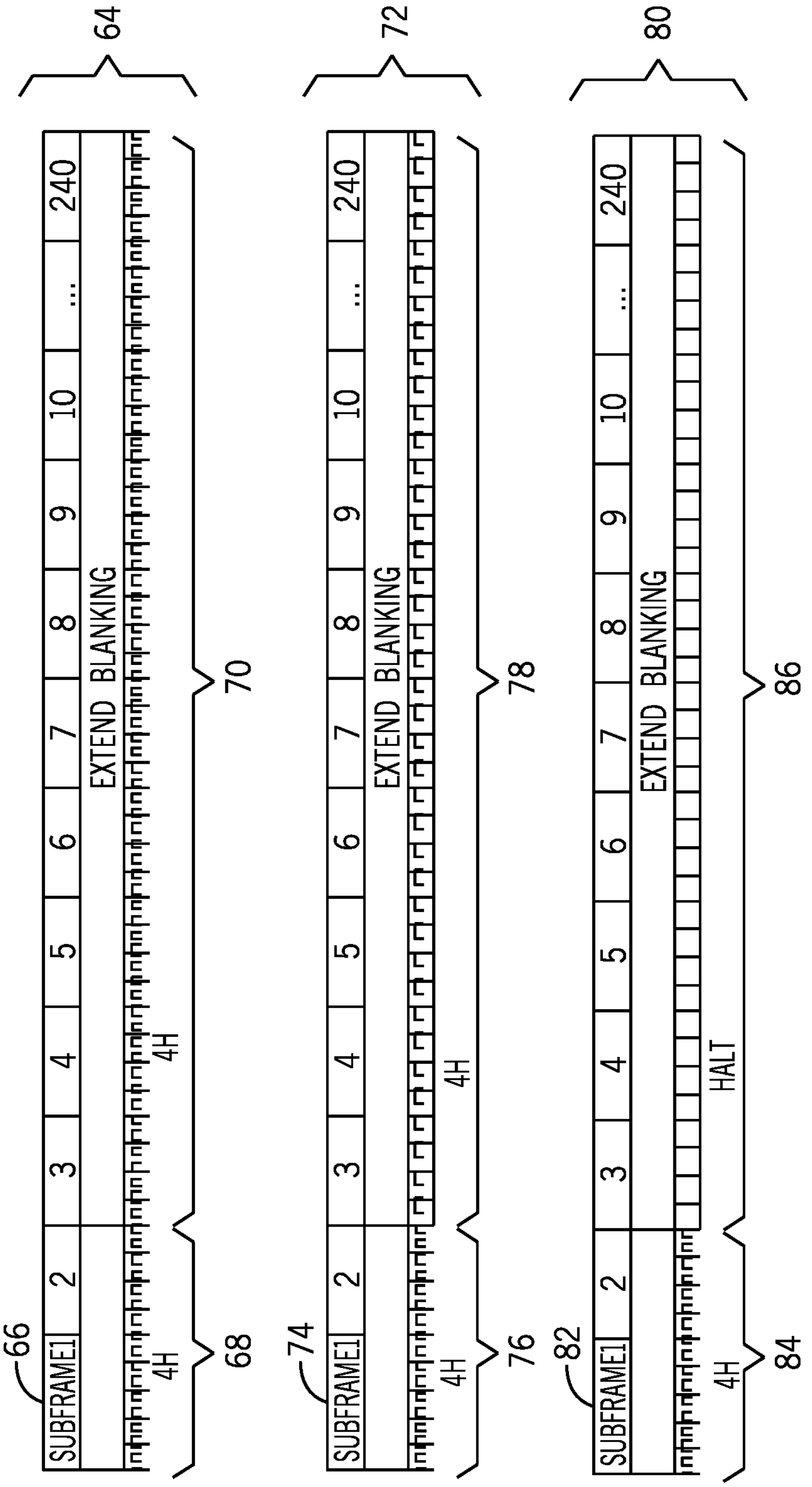
FIG. 8 is a graphical representation of clock frequency control during normal and extended blanking operations in the electronic display, in accordance with an embodiment.

With the foregoing in mind, FIG. 8 is a graphical representation of clock frequency control during normal and extended blanking operations in the electronic display 12, in accordance with an embodiment. The electronic device, via the display driver circuitry 60, may alter the frequency of clock signals sent to display control circuitry (e.g., GIP circuitry) of the display during extended blanking operations of the display. The clock signal frequency sent to the display control circuitry may be reduced and/or halted for any portion of the display control circuitry (e.g., GIP circuitry) of the electronic display 12.

The clock signals sent to the display control circuitry, including the GIP circuitry may control switches at the pixel level of the electronic display 12, and may control circuitry related to programming functions, emission toggle functions (e.g., maintain constant luminance of the display pixels), or any other display circuitry function. During extended blanking operations of the electronic display 12 (e.g., low refresh rate of image frames), not all GIP circuitry operations may be performed for the electronic display 12. Certain portions of GIP circuitry may be sent clock signals independently of other GIP circuitry portions within the electronic display 12. For example, the display driver circuitry 60 of the electronic display 12 may be running during all image display operations, and may modify a given clock group (e.g., clock signals sent to same portion of GIP circuitry) signal frequency for each of the GIP circuitry portions within the electronic display 12.

For example, the display driver circuitry 60 may instruct a first clock group 64 to produce clock signals at an initial frequency (e.g., 120 Hz) corresponding to normal mode display operation during image frame display. The clock signals may be received by a first GIP circuitry portion of the display that may be maintained at the normal operating mode power levels. Additionally, the display driver circuitry 60 may instruct a second clock group 72 to produce signals at a reduced frequency (e.g., 10 Hz) relative to normal mode display operation. The second clock group signals 72 may be received by a second portion of GIP circuitry of the electronic display 12. Further, the display driver circuitry 60 may instruct a third clock group 80 to halt clock signals sent to a third portion of the GIP circuitry of the electronic display 12. It should be understood, the clock group signal frequencies may be adjusted dynamically throughout display operation, based on blanking mode operations and normal mode operations carried out by the electronic display 12.

For example, a first clock group 64 is depicted, illustrating a graph of clock signal frequency during operations of the display. During normal mode operations 68 (e.g., 120 Hz refresh rates) of the electronic display 12 for the first clock group 64, the clock signals sent to the GIP circuitry of the electronic display 12 may be toggled at an initial frequency per image sub-frame 66 corresponding to normal operations of the electronic display 12. During extended blanking operations 70, the first clock group 64 initial signal frequency may be maintained, and the first clock group 64 signal may be sent to certain portions of GIP circuitry for the display throughout the extended blanking operations 70 of the display. For example, the GIP circuitry that receives the first clock group 64 signals may control OLED emission and may be maintained at the normal mode clock signal frequency regardless of the display refresh rate. This may ensure a consistent display performance for the display of the front screen of the electronic display 12.

Additionally, a second clock group 72 is depicted, illustrating a graph of clock signal frequency during operations of the display. During normal operations 76 the clock signal frequency received by the GIP circuitry may be an initial signal frequency (e.g., 8 Hz) per image sub-frame 74. The electronic display 12 may implement extended blanking operations 78, and the clock signal frequency sent to the GIP circuitry may be updated to half frequency of the normal operation frequency. For example, the clock signal frequency sent to the control circuitry of the electronic display 12 may be updated to a half frequency of the initial signal frequency (e.g., 4 Hz). In some embodiments, GIP circuitry may be maintained at a certain frequency throughout the extended blanking operations although the frequency may be lower than normal display mode operations, such that a storage capacitor ($C_{st}$) may be fully charged throughout all image display operations.

Further, a third clock group 80 is depicted, illustrating a graph of clock signal frequency during operations of the display. During normal mode display operations 84 the clock signal frequency may be an initial signal frequency (e.g., 8 Hz) per image sub-frame 82, this may be during initial display of the image frame. The electronic display 12 may implement extended blanking operations 86, and the clock signal frequency may be halted during the extended blanking operations 86. It should be understood that any suitable reduction in clock frequency signal (e.g., half frequency, quarter frequency, eighth frequency) relative to clock frequency sent during normal operations to the control circuitry may be implemented. The GIP circuitry that corresponds to pixel compensation operations of the electronic display 12 may be halted during blanking operations of the electronic display 12. The lower refresh rate of the display corresponds to a lower pixel compensation frequency, therefore the GIPs that are associated with pixel compensation functions may be halted during the lower refresh rate operations of the display.

As discussed above, different clock signal frequencies may be implemented based on the GIP circuitry the clock signals are being sent to within the electronic display 12. For example, certain GIP circuitry of the display may always receive a clock signal when the display is displaying image data. In this case, the clock frequency may be reduced but not halted, to ensure that the output of the GIP circuitry causes the display to remain at a desired output.

Figure 9:
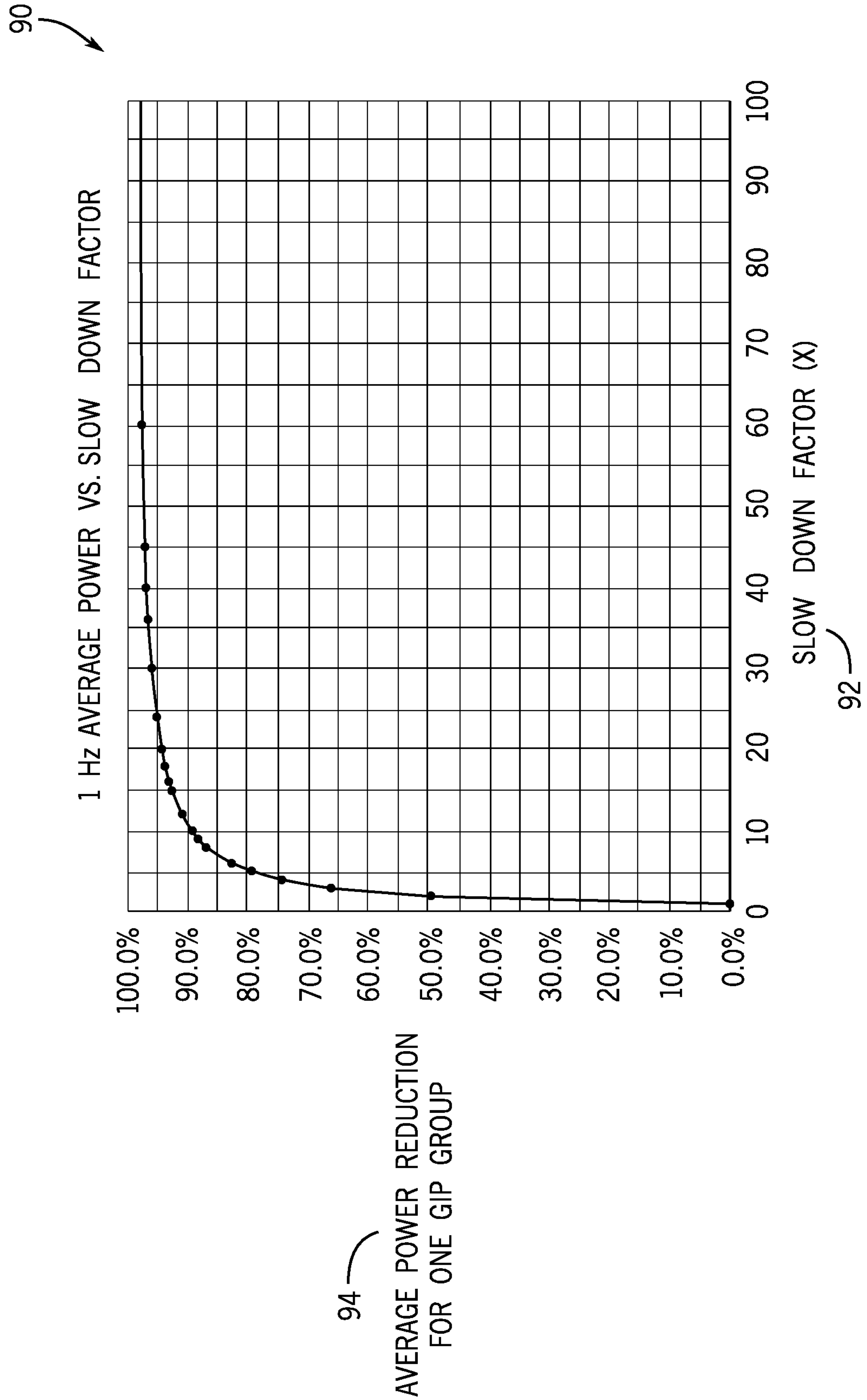
FIG. 9 is a graph of average power reduction in control circuitry of the electronic display based on clock frequency reductions, in accordance with an embodiment.

With the foregoing in mind, FIG. 9 is a graph 90 of clock frequency control during normal and extended blanking operations in the electronic display 12, in accordance with an embodiment. The reduction of clock signal frequency sent to the GIP circuitry of the electronic display 12 during blanking operations, may result in an overall power reduction for the GIP circuitry of the electronic display 12. This may aid in power saving during blanking mode operations in the electronic display 12.

The graph 90 of reduction in clock frequency signal (e.g., slow down factor) 92 versus power reduction per for one GIP circuitry group 94 within the electronic display 12 is depicted. The slow down factor 92 (e.g., reduction in clock frequency signal relative to a normal operation mode of the electronic display 12) is graphed along the x-axis and the average power reduction in hertz for one GIP circuitry group 94 within the electronic display 12 is graphed along the y-axis. As is demonstrated, a reduction of clock signal frequency by a factor of five, would result in an average power reduction of 80% for the GIP circuitry group within the electronic display 12. For example, if a GIP circuitry group in normal operations receives a clock frequency signal, during blanking operations the clock frequency signal may be reduced to half the initial frequency, the overall power output for the GIP circuitry group would be reduced by 80%, resulting in significant power savings for the electronic device.

Further, if the clock signal frequency sent to the GIP circuitry group of the electronic display 12 is reduced by a factor of ten, it would result in an average power reduction of 90% for the GIP circuitry group. The reduction in power savings starts to plateau past the reduction of clock signal frequency by factor of 10, as the reductions by a factor of 20-100 result in average power reductions in the range of about 90%-98% (e.g., factor of 20 reduction of ~95%, factor of 30 reduction of ~96%, factor of 40 reduction of ~96%, factor of 50 reduction of ~97%, factor of 60-100 reduction of ~98%). It is therefore shown, that a slowdown factor of five is beneficial in average power savings for each GIP circuitry group of the electronic display 12.

Figure 10:
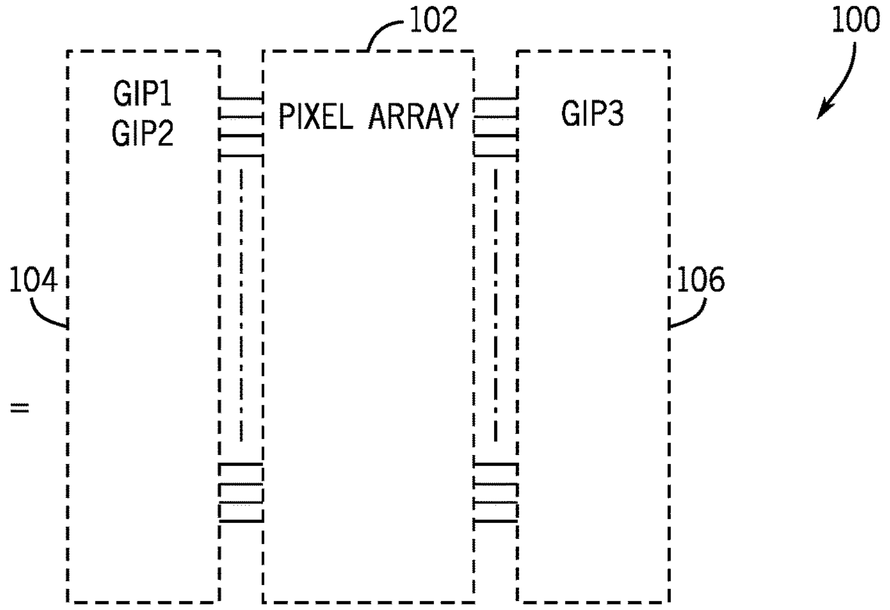
FIG. 10 is a schematic diagram of electronic display circuitry, in accordance with an embodiment.

With the foregoing in mind, FIG. 10 is a schematic diagram of display circuitry 100, in accordance with an embodiment. The display circuitry 100 may include a pixel array 102 that includes multiple display pixels connected to a first and second GIP circuitry group 104 and a third GIP circuitry group 106. The clock signal frequency sent to each group of GIP circuitry may be controlled independently based on the electronic display 12 mode and the GIP circuitry functions.

Figure 11A:
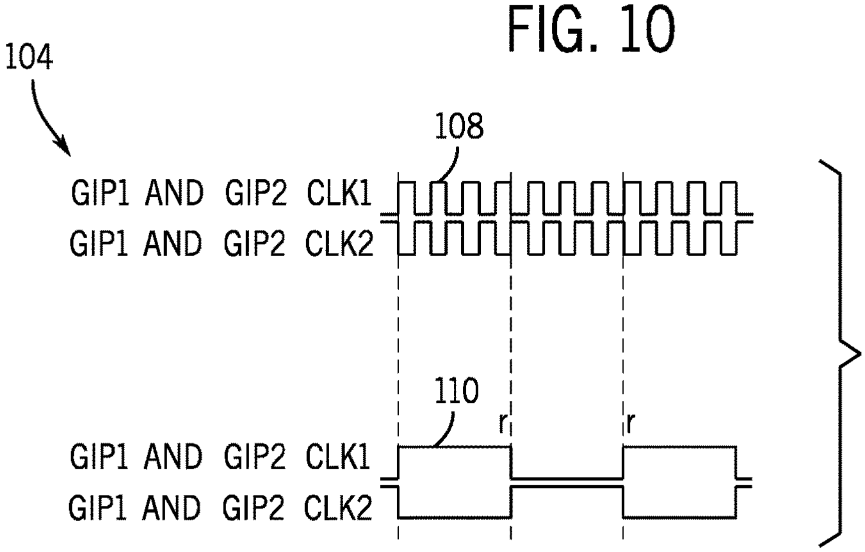
FIG. 11A is a diagram of clock signal frequency reduction in the electronic display, in accordance with an embodiment.

Each of the GIP circuitry groups 104, 106 may receive clock frequency signals, via the display driver circuitry 60, based on the electronic display 12 operations. For example, each GIP circuitry group may receive a clock signal that causes each GIP circuitry group to output emission signals for each side of the display to adjust brightness of the display, or assist in other display operations. For example, FIG. 11A is a diagram of clock frequency reduction in the electronic display 12, in accordance with an embodiment. The first and second GIP circuitry group 104 may be maintained at a certain frequency throughout the extended blanking mode operations, although the frequency may be lower than the normal mode frequency, such that the $C_{st}$ may be fully charged throughout all image display operations. For example, the normal mode clock frequency signal 108 output during normal mode operations may correspond to a frame refresh rate of 120 Hz. The blanking operations clock frequency signal 110 may correspond to a lower refresh rate (e.g., 30 Hz) after the active frame is displayed. During an active image frame, the clock signal frequency sent to the first and second GIP circuitry group 104 may correspond to a 120 Hz refresh rate. Then, when the electronic display 12 is operating at a lower refresh mode, the clock frequency may be reduced to a 30 Hz refresh rate or similar lower rate. It should be understood, that nay suitable refresh rate may be implemented by the control circuitry.

Figure 11B:
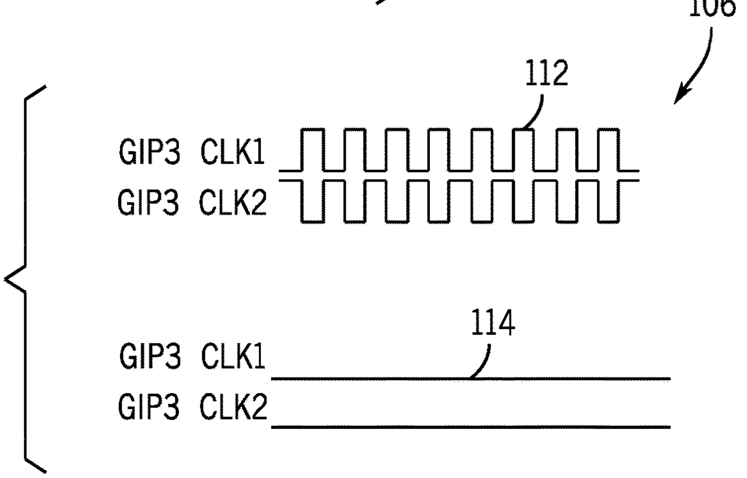
FIG. 11B is an additional diagram of clock signal frequency reduction in the electronic display, in accordance with an embodiment.

Additionally, the GIP circuitry group may be halted in some cases to preserve lower power output during blanking operations of the electronic display 12. For example, FIG. 11B is a flow diagram of an additional diagram of clock frequency reduction in the electronic display 12, in accordance with an embodiment. The third GIP circuitry group 106 may correspond to GIP circuitry that performs pixel compensation operations of the electronic display 12. The normal mode clock frequency signal 112 output during normal mode operations may correspond to a frame refresh rate of 120 Hz. The lower refresh rate of the display corresponds to a lower pixel compensation frequency, therefore the GIPs that are associated with pixel compensation functions may be halted during the lower refresh rate operations of the display. The third GIP circuitry group 106 may receive a halted clock signal 114 for any period of time corresponding to the lower refresh rate. It should be understood, that nay suitable refresh rate and/or halt length may be implemented by the display driver circuitry 60.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A display driving device, comprising a plurality of row drivers coupled to a respective row of pixels of an electronic display; and control circuitry configured to:

in response to the display driving device refreshing image frames at a rate below a threshold rate, reduce an initial clock signal frequency sent to gate-in-panel (GIP) circuitry; and in response to the display driving device refreshing the image frames at a rate above the threshold rate, update a clock signal frequency to the initial clock signal frequency sent to the GIP circuitry.

2. The display driving device of claim 1, wherein the reduction in the initial clock signal frequency comprises a half frequency reduction, a quarter frequency reduction, an eighth frequency reduction, or any combination thereof.

3. The display driving device of claim 1, wherein the reduction in the initial clock signal frequency comprises individual reductions for each of the GIP circuitry based on a GIP circuitry position within the display driving device.

4. The display driving device of claim 1, wherein the reduction in the initial clock signal frequency comprises halting clock signal production for a period of time.

5. The display driving device of claim 1, wherein the display driving device is determined to be refreshing the image frames at the rate above the threshold rate when the image frames contain new content.

6. The display driving device of claim 1, wherein the reduction in the initial clock signal frequency comprises halting the clock signal frequency, reducing the clock signal frequency, maintaining the clock signal frequency, or any combination thereof.

7. The display driving device of claim 1, wherein the initial clock signal frequency is in a range of 100 to 150 Hertz.

8. The display driving device of claim 1, wherein the reduction of the initial clock signal frequency is in a range of 10 to 40 Hertz.

9. The display driving device of claim 1, wherein an additional GIP circuitry is maintained at the initial clock signal frequency.

10. A method comprising:

in response to determining, via control circuitry, that a display driving device is refreshing image frames at a first rate below a threshold rate, reducing an initial clock signal frequency sent to gate-in-panel (GIP) circuitry and maintaining a clock signal frequency sent to an additional GIP circuitry; and in response to determining, via the control circuitry, that the display driving device is refreshing the image frames at a second rate above the threshold rate, updating the clock signal frequency to the initial clock signal frequency sent to the GIP circuitry.

11. The method of claim 10, wherein the GIP circuitry comprises GIP circuitry that performs pixel compensation operations for the display driving device.

12. The method of claim 10, wherein the reduction in the initial clock signal frequency comprises individual instructions for the GIP circuitry based on a GIP circuitry position within the display driving device.

13. The method of claim 10, wherein the reduction in the initial clock signal frequency comprises halting clock signal frequency production for a period of time.

14. The method of claim 10, wherein the display driving device is determined to be refreshing the image frames at the second rate above the threshold rate when the image frames contain new content.

15. The method of claim 10, wherein the GIP circuitry comprises GIP circuitry that controls OLED emission of the display driving device.

16. A display driving device, comprising:

a plurality of row drivers coupled to a respective row of pixels of an electronic display; and control circuitry configured to:

in response to the display driving device refreshing image frames at a first rate below a threshold rate, reduce an initial clock signal frequency sent to gate-in-panel (GIP) circuitry by a first amount and reduce a clock signal frequency sent to an additional GIP circuitry by a second amount less than the first amount; and in response to the display driving device refreshing the image frames at a second rate above the threshold rate, update the clock signal frequency to the initial clock signal frequency sent to the GIP circuitry and the clock signal frequency sent the additional GIP circuitry.

17. The display driving device of claim 16, wherein the reduction in the initial clock signal frequency of the first amount and the second amount comprises a half frequency reduction, a quarter frequency reduction, an eighth frequency reduction, or any combination thereof.

18. The display driving device of claim 16, wherein the GIP circuitry comprises GIP circuitry that performs pixel compensation operations for the display driving device.

19. The display driving device of claim 16, wherein the reduction in the initial clock signal frequency of the first amount and the second amount comprises halting clock signal frequency production for a period of time.

20. The display driving device of claim 16, wherein the display driving device is determined to be refreshing the image frames at the second rate above the threshold rate when the image frames contain new content.

* * * * *